Patented Dec. 20, 1927.

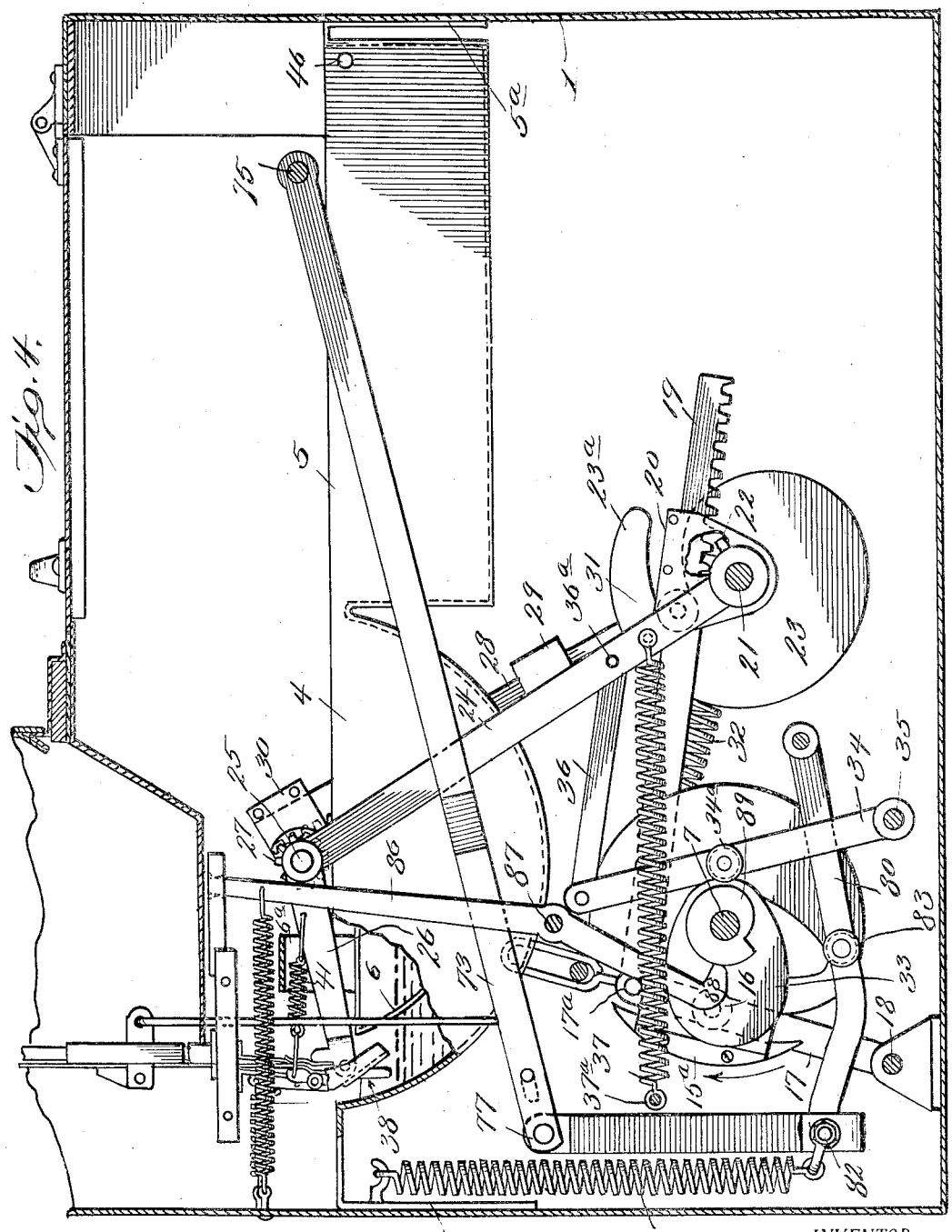

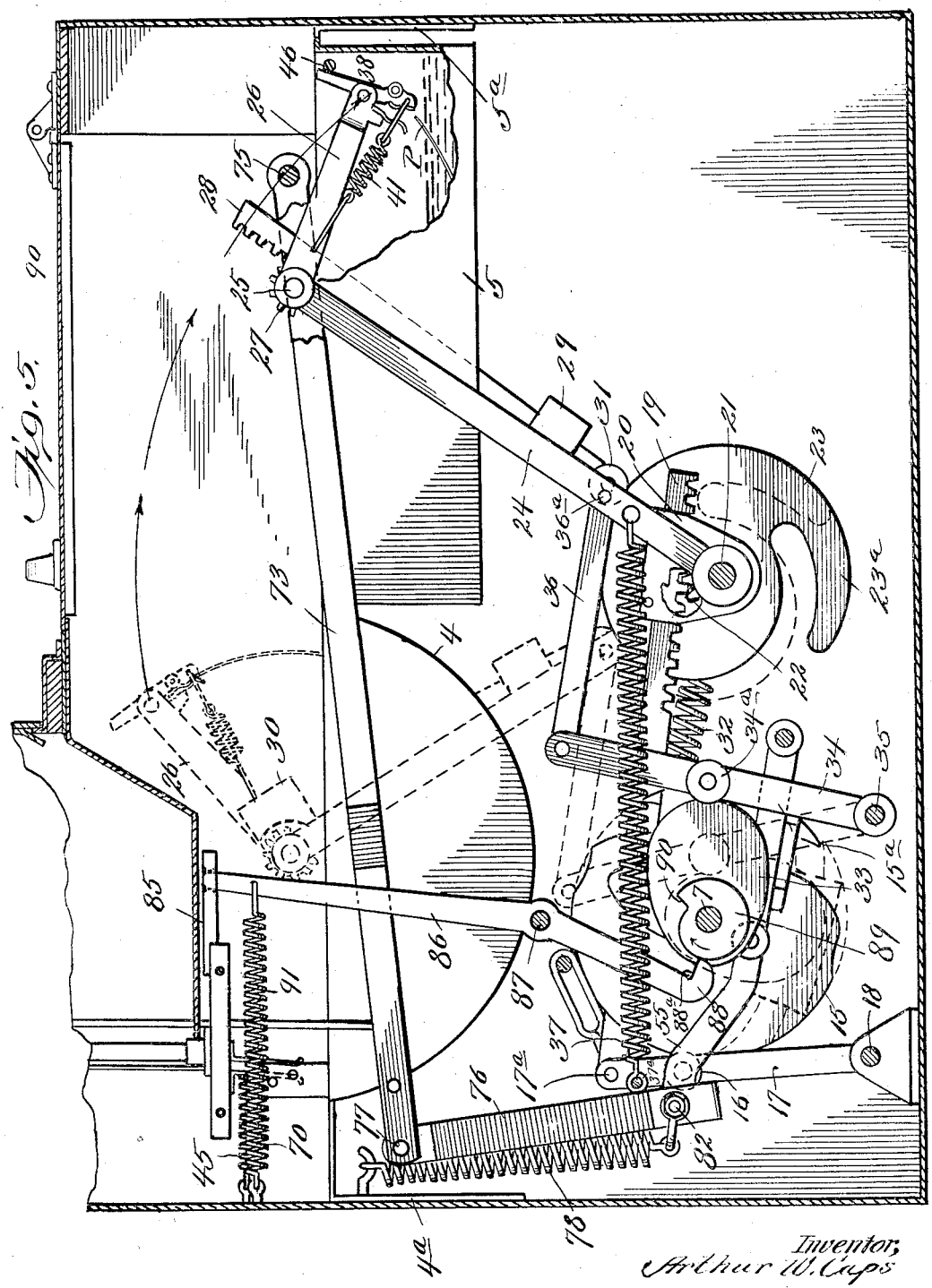

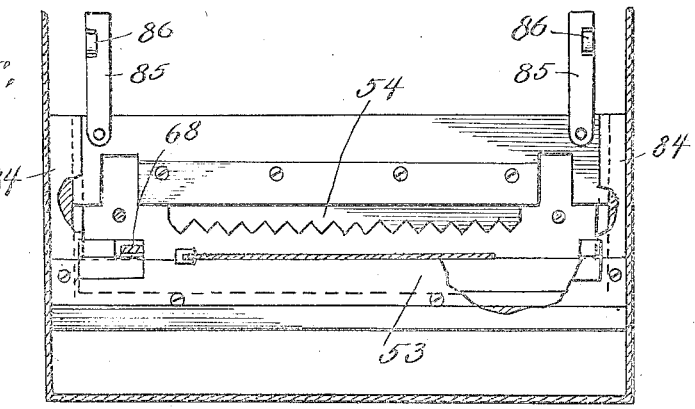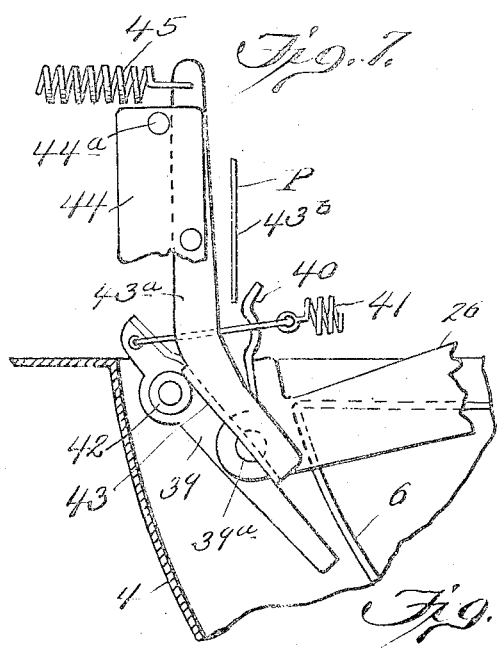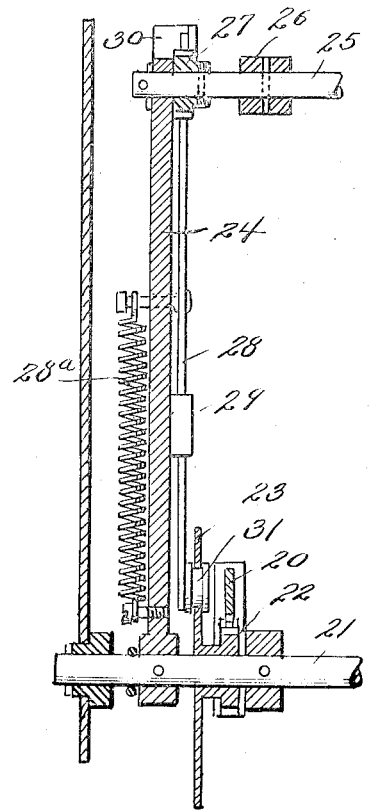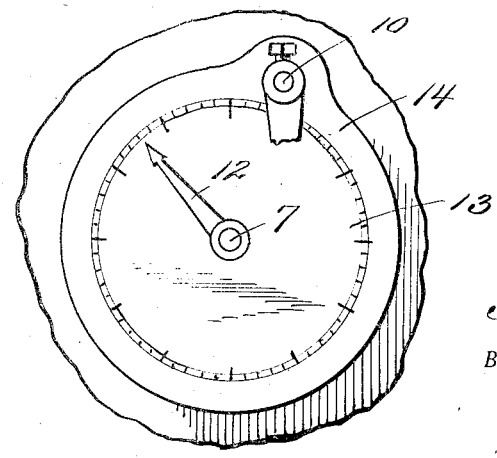

1,653,429

UNITED STATES PATENT OFFICE.

ARTHUR W. CAPS, OF KANSAS CITY, MISSOURI, ASSIGNOR TO PHOTOSTAT CORPORATION, OF PROVIDENCE, RHODE ISLAND, A CORPORATION OF RHODE ISLAND.

PHOTOGRAPHIC DEVELOPING APPARATUS.

Application filed April 3, 1925. Serial No. 20,505.

The present invention relates to improvements in photographic apparatus and more particularly to photographic machines of the class embodying means for exposing therein a sheet of photographic paper, and means for removing the exposed paper from the field of exposure and for causing developing and fixing operations to be performed thereon.

The primary object of the invention is to provide improved means for introducing the exposed prints into the developing and fixing baths within the machine whereby the developing and fixing operations may be performed rapidly and efficiently and without the necessity of moving the developing and fixing baths, or either of them, thus avoiding slopping of the developing and fixing chemicals within the machine and thereby insuring cleanliness and minimizing or avoiding corrosion of the parts of the machine.

Another object of the invention is to provide means which is operative automatically or by the action of a crank or similar operating member, to cause the operations involved in the introduction of the exposed sheets into the developing bath and the transfer of the sheets or prints from the developing bath to the fixing bath, to take place in their proper sequence, thus insuring the performance of these different operations in the proper order and avoiding the necessity of a plurality of manual operations.

To these and other ends, the invention consists in certain improvements and combinations and arrangements of parts, all as will be hereinafter more fully described, the features of novelty being pointed out particularly in the claims at the end of the specification.

In the accompanying drawings:—

Figure 4 represents on an enlarged scale a vertical section taken on the line 4—4 of Figure 3 and looking in the direction of the arrow, the print transferring mechanism being shown in position to receive an exposed print;

Figure 5 is a view similar to Figure 4 but showing the print transferring mechanism in position to deliver a developed print into the fixing bath;

Figure 6 represents a section taken on the line 6—6, Fig. 3, looking in the direction of the arrow, illustrating the strip severing knife and adjacent parts in top plan;

Figure 7 is a detail view on an enlarged scale of the gripper which receives the exposed sheet, and the cooperating means which opens the gripper preliminary to its engagement with the exposed sheet;

Figure 8 represents a section taken on the line 8—8, Fig. 1, looking in the direction of the arrow, showing in section one of the transfer arms and the operating mechanism associated therewith; and Figure 9 is a detail view of the indicator dial and its cooperating indicator.

Similar parts are designated by the same reference characters in the several views.

Figure 1:
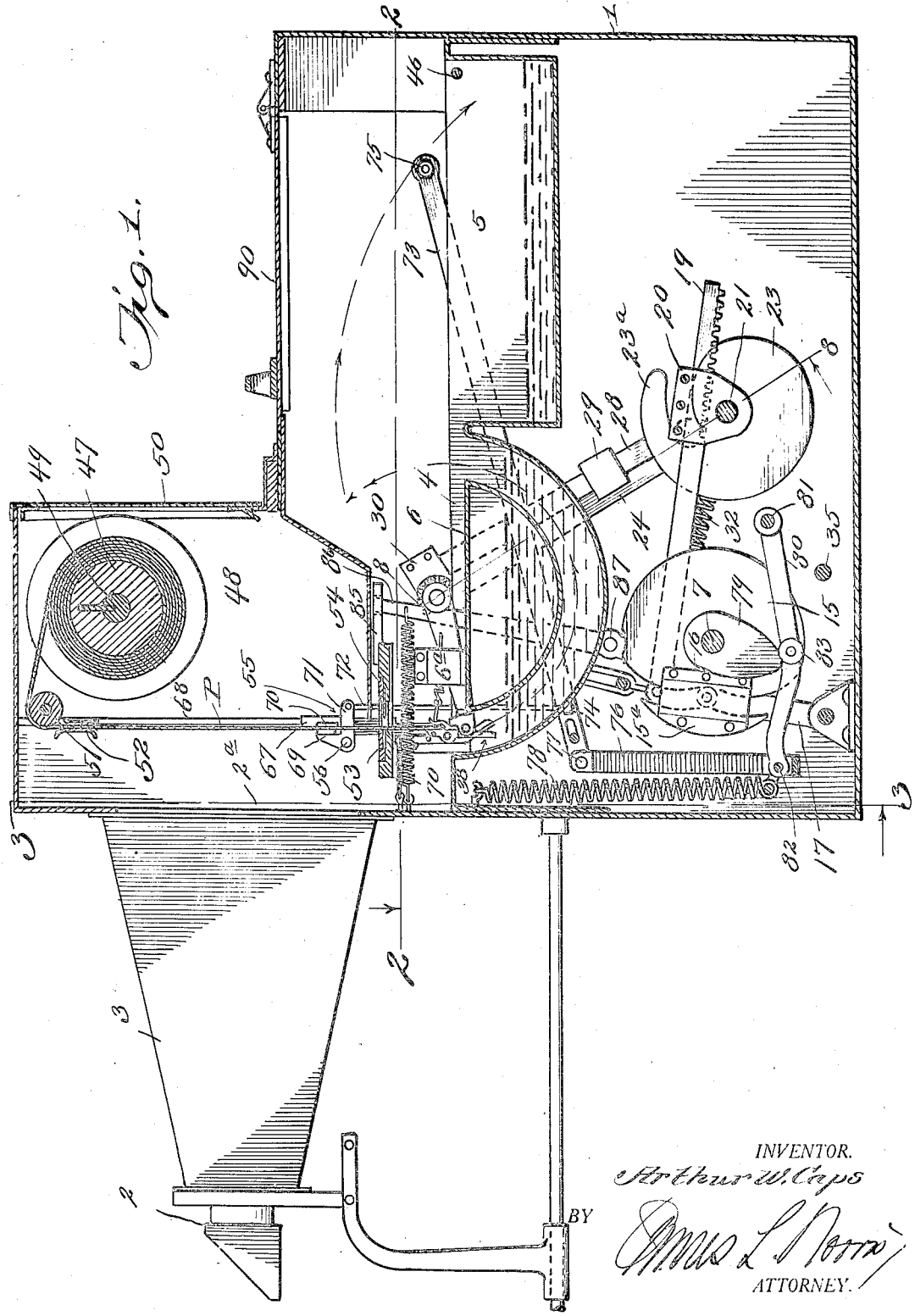
Figure 1 represents a central vertical section through a photographic machine constructed in accordance with the present invention, the section being taken along the line 1—1 of Figure 3 and looking in the direction of the arrow.

The present invention is applicable to photographic machines or apparatus of various kinds employing developing and fixing baths for the treatment of photographically exposed sheets or prints. The invention is particularly applicable to photographic machines of the class wherein sections of a sensitized sheet are successively exposed within the machine, and these exposed sections are subjected to developing and fixing operations within the machine. The preferred embodiment of the invention is shown in the present instance applied to one form of photographic machines of this class, but it is to be understood that the invention is not restricted to the precise construction shown as equivalent constructions are contemplated, and such will be included within the scope of the claims.

In the present instance, 1 designates generally the casing of the machine, this casing and the other parts of the machine being preferably composed of metal, 2 designates a lens and prism unit which may be similar to those used in machines of this class for directing the rays from the object to be photographed into the machine through the exposure opening 2ª in the front thereof to effect exposure of a section of a photographically sensitized sheet or strip of paper or similar material, and 3 designates a bellows which provides a light-tight closure for the space between the lens and the front of the casing. The bellows 3 may be composed of a metal housing in the form of a truncated cone when the machine is built for a fixed focus as adjustment of the lens is then unnecessary.

A developer tray or pan 4 adapted to contain a bath of any suitable photographic developing solution, and an adjacently located tray or pan 5 adapted to contain hypo or any other suitable photographic fixing solution are mounted within the casing of the machine. These trays 4 and 5 are preferably mounted on the same level or in substantially the same horizontal plane, and they may be joined together at their adjacent ends, as shown. The developer tray 4 has a bottom which is preferably of substantially semi-cylindrical form and which preferably contains a guide 6 which is concentric with the bottom of the developer tray, so that it forms an annular substantially semi-circular passageway between it and the bottom of the tray for the passage of an exposed sheet to be developed. The guide 6 may be secured in fixed position within the developer tray by brackets 6ª attached to the sides of the casing, or by any other suitable means. The developer and fixing trays 4 and 5 occupy a fixed position within the machine, they being fastened or supported therein, for example, by the extensions 4ª and 5ª at the ends thereof which may be attached in any suitable way to the front and rear walls of the casing.

Mechanism is provided by the present invention which effects the operations of introducing an exposed sheet into the developing bath, of transferring the developed sheet or print from the developing bath to the fixing bath and for releasing or delivering the print to the fixing bath automatically and in properly timed sequence, and in the preferred embodiment of the invention these operations are thus performed by the actuation of a single crank or equivalent actuating member. In the particular embodiment of the invention shown, these various operations are caused to take place by or under the control of a shaft 7 which is revolubly mounted in the lower portion of the casing and carries a series of cams which will be hereinafter described. The cam shaft 7 is preferably connected through reduction gearing comprising a large gear 8 fixed on the shaft 7 and a pinion 9 fixed on a shaft 10, the latter being journalled in the casing, to an operating crank or handle 11 arranged exteriorly of the machine, this crank being fixed to the shaft 10. Preferably, an indicator or pointer 12 is fixed on the end of the cam shaft 7 at a point exteriorly of the machine, the pointer being arranged to cooperate with a dial 13 which may be mounted or marked on the outer wall of a housing 14, which latter encloses the gearing between the shafts 7 and 10. By using such a pointer and an appropriately marked dial, the exact position occupied by the cam shaft may be determined readily by observation of the pointer. A cam 15 of suitable shape is fixed on the cam shaft 7, this cam being arranged to cooperate with a roll 16 which projects from one side of a lever 17, the latter being pivoted at its lower end to a pin or shaft 18 which is supported on the casing of the machine. The lever 17 is pivotally connected at 17ª to a reciprocatory rack 19 which operates in a guide 20 supported on a shaft 21, the teeth on the rack meshing with a gear or pinion 22 which is revolubly mounted on the shaft 21 and is connected to a cam 23 which is also revolubly mounted on the shaft 21 so that the gear 22 and cam 23 will revolve in unison when the rack 19 is reciprocated.

A pair of arms 24 are fixed at their lower ends to the shaft 21 toward the outer ends of the latter, these arms extending upwardly from said shaft and carrying at their upper ends a shaft 25 which is revoluble therein. The shaft 25 has fixed thereto, at points adjacent to the arms 24 a pair of arms 26 which are adapted to swing in unison with rotation of the shaft 23. The latter shaft also has a gear 27 fixed thereto, at a point in its length adjacent to one of the arms 24. The gear 27 on the shaft 25 cooperates with a rack 28, the latter being mounted to reciprocate in guides 29 and 30 attached to the respective arm 24, the lower end of the rack 28 carrying a roll 31 which operates on the periphery of the cam 23. A spring 32 attached at one end to the lever 17 and at its opposite end to the side of the casing, serves to hold the roller 16 on the lever 17 in working contact with the cam 15 during the rotation of the latter, and a spring 28ª acts to hold the roller 31 against the cam 23.

The cam shaft 7 also has a cam 33 fixed thereon, this cam cooperating with a roller 34ª on a lever 34, the latter being mounted at its lower end on a relatively fixed shaft 35 suitably supported within the casing and the upper end of the lever 34 being pivotally attached to one end of a link 36, the opposite end of this link being pivotally connected at 36ª to the arm 24 at that side of the machine. The cam 33 acts on the lever 34, through the link 36 to swing the pair of arms 24 toward the rear of the machine, the arms 24 being fixed at their lower ends to the shaft 21 so that they will both swing in unison.

A spring 37 which is attached at one end to one of the arms 24 and at its opposite end to a stud 37ª projecting from the adjacent side of the casing serves to hold the roller 34ª in working contact with the periphery of the cam 33 and to swing the arms 24 toward the front of the machine under the control of the cam 33.

Figure 2:
Figure 2 represents a horizontal section through the machine taken on the line 2—2 of Figure 1 and looking in the direction of the arrow.
Figure 3:
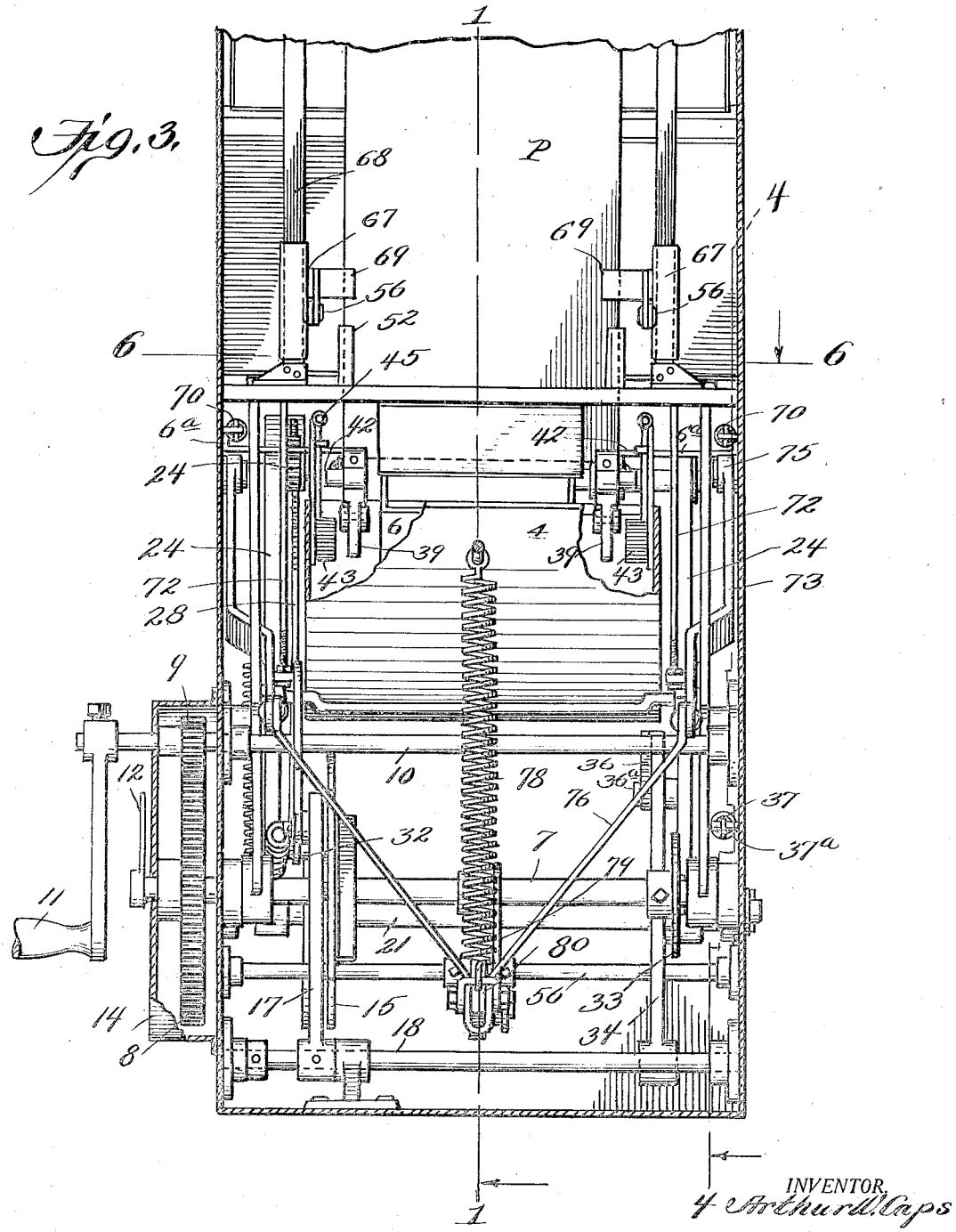
Figure 3 represents a transverse vertical section through the machine taken on the line 3—3 of Figure 1 and looking in the direction of the arrow.

The arms 26 carry clamps or grippers which grasp the end of the exposed sheet of photographic paper for the purpose of pulling the exposed section of the sheet into the developing bath and for subsequently transferring the developed sheet or print to the fixing bath, the transferring operation taking place in consequence of a swinging movement of the arms 24 with the shaft 21 as a center. It will be understood from Figures 2 and 3 that the arms 24 swing at opposite sides of the developer and fixing trays 4 and 5 and that the arms 26 are adapted to swing within the developer tray 4 and to swing into the fixing tray 5. In the present instance, each arm 26 carries at its free end a clamp or gripper designated generally at 38, each clamp or gripper comprising, as is shown most clearly in Figure 7, a member 39 which is pivoted on the extremity of the respective arm 26 at 39ª, and a cooperative shoe or member 40 which is fixed on the end of the arm 26, a spring 41 which is attached at one end to the pivoted gripper member 39, and at its opposite end to the respective arm 26 acting to press the pivoted gripper member 39 toward the cooperating member 40. The gripper member 39 has a roller or projection 42 extending from one side thereof which is arranged to come into engagement with the under side of a switch plate 43 as the gripper is moving into position to grip the end of an exposed section of the photographic strip designated P. The switch plate 43 is fixed to and projects laterally from a side of a lever 43ª which is pivoted at 43ᵇ to a stationary support or bracket 44, and a pin or projection 44ª is provided against which the upper end of the lever 43ª may abut in order to determine the normal position of the switch plate 43, the lever 43ª being normally held against the pin or projection 44ª by a spring 45 which operates upon its upper end. In using a gripper of this construction, the roller or projection 42 on the pivoted gripper member 39 comes into engagement with the under side of the switch plate 43 as the gripper approaches the point where it engages the end of the exposed section of the photographic strip. The switch plate is inclined and it consequently forces the gripper member 39 into open position, in opposition to the action of the spring 41, the gripper members 39 and 40 being thus brought into positions at opposite sides of the photographic sheet P, as will be understood from Figure 7. As the upward movement of the gripper continues, the roller 42 will ride past the upper end of the switch plate 43, whereupon the spring 41 will act to force the member 39 against the cooperating gripper member 40, the gripper thus closing upon and gripping the end of the exposed section of paper. When the gripper descends, the switch plate 43 will be idly pushed aside by the roller 42, this being permitted owing to the pivoting of its supporting lever 43ª and the yielding of the spring 45. The final releasing of the paper from the grippers is preferably effected by a bar or rail 46 which extends across the rear end of the fixing tray 5 and is in the path of the trails of the pivoted gripper members 39, the tails of the pivoted gripper members being pressed against the rail 46 during the final part of the rearward swing of the arms 24, as is shown in Figure 5.

Any suitable means may be employed for feeding the strip of sensitized paper or other photographic material into the field of exposure of the lens and for advancing the strip to the point where the end of its exposed section may be engaged by the grippers. As shown in the present instance, the strip of sensitized or photographic material is supplied to the machine in the form of a roll 47 which may be mounted in the roller compartment 48 within the casing and revolubly supported therein by a shaft 49. A door 50 in the casing provides means of access to the roller compartment 48. The end of the strip is led over an idler roller 51 which is freely revoluble in the upper portion of the casing, and the strip passes downwardly from this roller through guides 52 so that it occupies a position in the focal plane of the exposing lens. The strip is arranged to pass through an opening formed between a stationary knife 53 and a cooperating reciprocatory severing knife 54, this opening being directly above the grippers 38 when the latter are swung forwardly and upwardly into a position to grip the end of the strip, as shown in Figs. 1 and 7. The strip advancing means comprises in the present instance a pair of reciprocatory members 55 which are arranged beyond the opposite longitudinal edges of the strip, these members being pivoted at 56 to slides 67 and the slides being mounted to reciprocate vertically or in a direction longitudinally of the strip by rails 68 which are fixed in the casing at opposite sides of the strip and parallel to its lonigtudinal edges. Each strip advancing member 55 is provided with a jaw 69 which is adapted to bear on the front side of the strip at its margin, and each slide 67 is provided with a cooperating jaw 70 which is opposite to the respective jaw 69 and is arranged at the rear side of the sheet at its margin. Each sheet engaging member has an operating arm 71 which extends rearwardly from its pivot 56 so that downward movements of these arms 71 will cause the jaws 69 on the sheet advancing members to clamp or grip the respective edges of the sheet between them and the cooperating jaws 70, and upward movements of these arms 71 will release the grip of the jaws on the paper strip.

Any suitable means may be provided for actuating the sheet advancing members in properly timed relation to the other operations of the machine. As shown in the present instance, a rod 72 is attached to and extends downwardly from the actuating arm 71 of each strip advancing member to a lever 73 to which the respective rod is attached at 74. These levers 73 are arranged at the respective sides of the machine, at opposite sides of the developing and fixing pans 4 and 5, and they are arranged to swing or reciprocate in vertical planes in the spaces provided at the opposite sides of the developing and fixing pans. As shown, the rear end of each of these levers 73 is pivoted to the respective side of the casing at 75 and the forward ends of these levers are connected by a yoke-like member 76, this yoke-like member being preferably pivoted to the forward ends of the levers 73 as at 77. A spring 78 connected to the lower portion of the yoke 76 acts to swing the levers 73 upwardly after they have been lowered, and means is provided for lowering the levers 73 at proper intervals. As shown, such means comprises a cam 79 of suitable shape which is fixed on the cam shaft 7 and a lever 80, the rear end of which is mounted on a shaft 81 and the forward end of which is connected to the lower end of the yoke member 76 by the pivot 82. The lever 80 carries a roller 83 which rides upon the cam 79 during rotation of the cam shaft 7, the roller being held in engagement with the cam by the spring 78.

In using such a construction, the arms 71 of the strip advancing members will be raised by the spring 78 acting through the member 76, the levers 73 and the rods 72, in consequence of the riding of the roller 83 from the high part to the low part of the cam 79. This upward movement of the arms 71 first swings the strip advancing members about their pivots 56, thereby releasing the grip of the jaws 69 and 70 upon the portions of the strip which lies between them, after which the strip advancing members, together with their carrying slides 67, are elevated, they being guided in this motion by the rails 68. After the low part of the cam 79 has passed the roller 83, and the latter begins to ride up the high part of this cam, the rods 72, together with the yoke member 76 and levers 73, will be lowered, thereby pulling down the arms 71 of the strip advancing members, in consequence of which the jaws 69 are forced toward the respective jaws 70 on the slides 67, whereby the respective edges of the strip are clamped or gripped between these jaws, following which the strip advancing members and their slides 67 are drawn downwardly, the grip of the jaws 69 and 70 being maintained during the downward movement of the strip advancing members, in consequence of which the strip is advanced. In this way, a fresh section or portion of the sensitized strip is brought into the field of exposure of the lens after the preceding section of the strip has been exposed.

Any suitable means may be provided for actuating the severing knife 54 to cut off the exposed section of the strip after each advance thereof. As shown, for example, in the present instance, the reciprocatory knife 54 which may be supported at its ends to slide in guides 84 is operatively connected toward its ends by links 85 to the upper ends of levers 86. These levers are adjacent to the respective sides of the casing and operate in the spaces formed between the sides of the developing tray 4 and the sides of the casing and are pivoted at 87, and each of these levers is provided at its lower end with a projection 88 which is arranged to bear against the periphery of a cam 89, a pair of these cams being provided, one for each lever 86, and these cams being fixed on the cam shaft 7. Each cam 89 is formed with an abrupt portion 90 between its high and low parts, and the projection 88 of the lever is formed with a corresponding abrupt portion 88ª which permits the projection 88 to drop suddenly from the high to the low part of the cam. A spring 91 attached to each lever 86 acts to hold the projection 88 of the lever in contact with the periphery of its cam 89, the spring acting in a direction to cause movement of the severing knife 54 into severing relation with the cooperating knife 53. In using knife operating mechanism as just described, rotation of each cam 89 in the direction of the arrow (Fig. 5) causes the projection 88 of the respective lever 86 to ride up toward the high part of the cam during which time the movable knife 54 will be withdrawing from the cooperating knife 53. When the projection 88 of each lever reaches the abrupt portion 90 of its respective cam, the projection will drop suddenly to the low part of the cam, under the action of the spring 91. The pair of cams 89 are set on the cam shaft 7 so that the levers 86 will work in unison, and as the projections 88 on these levers drop to the low parts of the cams, the knife 54 will act quickly to sever the portion of the strip which extends between the knives.

The cam 15 which, as previously described, serves to actuate the gripper carrying arms 26, through its action on the roller 16, is preferably provided with an auxiliary part 15ª which, when the roller 16 reaches the low part of the cam 15, or the part thereof nearest to its center, will engage the outer side of the roller 16. The spring 32 acts to hold the roller 16 in contact with the outer periphery of the main portion of the cam 15, but when this roller reaches the lowest part of this cam, which takes place when the gripper carrying arms 26 reach the position shown in Figure 4, considerable resistance is offered to the action of the spring 32 owing to the riding of the projections 42 of the grippers on the switch plates 43, incident to the opening of the grippers. By providing the auxiliary or supplemental cam portion 15ª to engage the outer side of the roller 16 as the latter reaches the low part of the cam, the roller 16 is positively actuated, thus insuring completion of the upward swing of the arms 26 and proper opening of the grippers to receive the end of the paper strip.

The mode of operation of a photographic machine constructed in accordance with the embodiment thereof above described, is as follows: When the machine is in its normal position of rest, the swinging arms 24 and the gripper carrying arms 26 occupy the position shown by the dotted lines in Figure 5, the grippers being elevated above the rear end of the developing tray 4. Rotation of the crank or handle 11 operates through the gears 8 and 9 to rotate the cam shaft 7, at a reduced speed, in the direction indicated by the arrow in Figure 5. The first part of this rotation of the cam shaft causes the cam 15 to act on the cooperating roller 16, so that the latter may move toward the low part of this cam, thus allowing the spring 32 to reciprocate the rack bar 19 rearwardly and, in consequence, rotating the gear 22 and the cam 23 connected therewith. Such rotation of the cam 23 causes the rack 28 to descend, in consequence of which the gripper carrying arms are caused to swing in a direction downwardly and forwardly with the shaft 23 as a center, this shaft being then positioned concentrically above the substantially semi-cylindrical bottom of the developing tray. The gripper carrying arms 25 continue their swing, while the arms 24 remain in the dotted line position shown in Figure 5 until they reach the strip-engaging position beneath the severing knives 53 and 54. As the grippers approach this position, the rollers 42 on the pivoted gripper members 30 engage and ride upon the under sides of the respective switch plates 43, the switch plates thus acting to swing the pivoted gripper members into open position so that the end of the strip which projects below the knives 53 and 54 may enter between the pivoted gripper members and the cooperative gripper members 40; and the final part of the swing of the gripper-carrying arms 26 in this direction causes the rollers 42 to pass beyond the upper ends of the switch plates 43 as the result of which the pivoted gripper members are closed upon the end of the strip and they exert gripping action thereon under the influence of their springs 41. During this final portion of the forward and upward swing of the gripper carrying arms 26, the supplemental portion 15ª of the cam 15 comes into engagement with the roller 16 and acts to positively complete such swing of the arms 26, notwithstanding the increased resistance offered by the riding of the rollers 42 on the switch plates. When the grippers reach the end of their swing in this direction, the roller 16 lies at the lowermost point on the cam 15. In order to further insure the completion of the swing of the gripper carrying arms 26 into gripping position and to furnish the power necessary to open the grippers, the cam 23 which causes lowering of the rack bar 28 may be provided with an over-hanging portion 23ª which comes into a position to engage the outer side of the roller 31 as the grippers approach the strip-engaging position, as shown in Figure 4, this overhanging portion 23ª of the cam serving to positively draw the rack bar 28 downwardly at this period in the operation.

As the rotation of the cam shaft 7 continues, the roller 16 will ride from the low part of this cam toward the high part thereof, and during this period the lever 17 is rocked forwardly, drawing the rack bar 19 forwardly and, in consequence, rotating the cam 23 in a reverse direction to its previous direction of rotation. This causes the rack bar 28 to rise, as the result of which the gripper carrying arms 26 are swung downwardly and rearwardly with the shaft 25 as a center, this shaft then occupying a position substantially concentric with the semi-cylindrical bottom of the developing tray 4, as shown in Figure 4. This swing of the grippers causes the exposed section of paper to be drawn in an arcuate path through the developer bath in the tray 4, the sheet moving through the arcuate passage formed between the bottom of this tray and the guides 6, and the swing of the grippers continues until the exposed paper has been fully introduced into the developer bath, whereupon rotation of the crank 11 may be interrupted in order to permit the paper to remain in the developer bath for a suitable period of time to complete its development. As the cam shaft 7 approaches or reaches this position, the cams 66 will assume positions where the projections 88 cooperating therewith are released, whereupon the knife 54 is caused to operate to sever the exposed section of the strip engaged by the grippers from the remainder of the strip.

After a sufficient period of time has elapsed to complete the development of the paper, the rotation of the crank 11 is continued as the result of which the gripper carrying arms 26 are swung upwardly to the position shown by the dotted lines in Figure 5, this being an intermediate position in the cycle of operations of the machine. As the operation of the crank 11 continues, the cam 33 acts on the roller 34$^a$ to swing the lever 34 rearwardly, the link 36 attached to this lever and to the arms 24 then acting to swing the arms 24 from the dotted line position, Figure 5, into the full line position shown in that figure. At this time, the gripper carrying arms 26 are in elevated position, the grippers thereon holding the developed print above the developer tray 4, and the gripper carrying arms remain in this elevated position during the rearward swing of the arms 24, the cams 15 and 33 being formed for this purpose with concentric portions which prevent shifting of the rack bar 28 relatively to the arms 24. The latter portion of the rearward swing of the arms 24 carries the print held by the grippers into the fixing bath contained in the tray 5, and as the final portion of the rearward swing of the arms 24 is approached, the tails of the pivoted gripper members 39 are pressed against the rod or rail 46 at the rear end of the fixing tray with the result that the grippers are opened against the action of their springs 41, and the print is thereby released from the grippers and is free to fall into the fixing bath. Continued rotation of the crank or handle 11 causes the arms 24 to swing forwardly from the full line position, Fig. 5, to the dotted line position shown in that figure, the gripper carrying arms during this period remaining in elevated position, and the parts may remain in this position preparatory to the commencement of the next cycle of operations.

In using strip advancing means of the kind hereinbefore described, the cam 79 is so set on the cam shaft 7, relatively to the cam 15 thereon that as the grippers rise to grip the strip, the cam 79 forces the roller 83 and the lever 80 carrying it downwardly, the lever 80 thus causing the links 72 to be drawn downwardly. The strip advancing members are thereby caused to grip the paper strip and to pull it downwardly into a position to be engaged by the grippers, the grippers then grasping the end of the strip with sufficient firmness to pull the strip downwardly into the developing bath.

The developed and fixed prints may be removed from the machine through an opening provided by a door 90 in the casing above the fixing tray 5.

Photographic machines embodying the present invention are capable of automatically introducing the exposed sections of a photographic strip into a developing bath and of transferring the same after development, into the fixing bath, the operations of the different mechanisms of the machine to secure these results being performed in the proper sequence, and in the preferred embodiment of the invention, these operations may be performed by the actuation of a single crank, handle, or similar part. Moreover, such machines are capable of operating rapidly and they avoid or minimize splashing or dripping of the developer and fixing chemicals within the machine, and hence cleanliness and freedom of corrosion of the metal parts of the machine are attained.

By so arranging the mechanism that the normal position thereof will be where the swinging transfer arms and the gripper carrying arms occupy the dotted-line position indicated in Figure 5, after delivering a print to the fixing bath, certain advantages are secured. Inasmuch as photographic paper is usually coated with a gelatine emulsion which, when wet, becomes sticky or gluey, and that the grippers are wet after passing through the developing bath into their paper-engaging position, the paper would become stuck to the grippers and would require tearing therefrom and, in consequence, the paper would become mutilated, if the machine were so arranged that, in its normal position of rest, the grippers were in their forward, paper-engaging position, and were in engagement with the paper for a considerable length of time, but by arranging the machine so that its normal position of rest is as above indicated, the grippers rise from the developing bath in wet condition, they grasp the print and carry it into and through the developing bath and then deliver it to the fixing bath before the print can become dry, and hence sticking of the print to the grippers is avoided. Moreover, in the normal position of the parts just described, the grippers are normally supported above the developing bath, and therefore will be dry and free from the corroding influence of the chemicals.

It will be understood that the present invention is not limited to the particular means shown for advancing the strip of paper, after each exposure, to enable the end of the strip to be engaged by the grippers, or the means shown for cutting off the strip, such being herein shown merely as examples of means suitable for accomplishing these purposes.

I claim as my invention:—

1. In photographic apparatus of the class described, the combination with receptacles to contain developing and fixing solutions respectively, of means for transferring a developed print from the developer receptacle to the fixing receptacle, and a device carried by said means and movable relatively thereto to conduct a print through the developer receptacle prior to its transfer.

2. In photographic apparatus of the class described, the combination with developer and fixing receptacles, of a device for conducting a print into and out of the developer receptacle, and means carrying said means and operative to conduct the same to a position to deliver a print to the fixing receptacle.

3. In photographic apparatus of the class described, the combination with developer and fixing receptacles, of a device operative to conduct a print into, through and out of the developer receptacle, a carrying means for said device operative to swing said device into a position to deliver a developed print to the fixing receptacle and mechanism for successively actuating said device and its carrying means in timed relation.

4. In photographic apparatus of the class described, the combination with receptacles to contain developing and fixing solutions respectively, of a reciprocatory member, and a print engaging device carried by said member and operative relatively to said member, when the latter is in one position, to conduct a print through the developer receptacle, said device being movable with said member, when the latter is reciprocated into another position, to deliver a developed print to the fixing receptacle.

5. In photographic apparatus of the class described, the combination with receptacles to contain developing and fixing solutions respectively, of a reciprocatory member, and a print engaging device mounted to rotate on said member and thereby carry a print into, through and out of the developer receptacle while said member is in one position, said device being reciprocable with said member to transfer a developed print to the fixing receptacle.

6. In photographic apparatus of the class described, the combination with a receptacle to contain a developer solution, of a carrying member movable toward and from the developer receptacle, a print-engaging device mounted to swing on said member and actuating means operative, when the latter is toward the developer receptacle, to swing it and a print through said receptacle.

7. In photographic apparatus of the class described, the combination with adjacently-located receptacles to contain developing and fixing solutions respectively, of means for introducing an exposed print into the end of the developer receptacle remote from the fixing receptacle, and for conducting such print through the developer receptacle and removing the developed print from the end of the developer receptacle which is adjacent to the fixing receptacle, and means for transferring the removed developed print to the fixing receptacle.

8. In photographic apparatus of the class described, the combination with adjacently-located receptacles to contain developing and fixing solutions respectively, of a reciprocable member, print-engaging means mounted to swing relatively to said member and operative, when the latter is reciprocated toward the developer receptacle, to conduct an exposed print downwardly through and upwardly out of the developer receptacle, said member when reciprocated in an opposite direction, carrying the print-engaging means while in elevated position and carrying a print, into a position for delivery into the fixing receptacle.

9. In photographic apparatus of the class described, the combination with a print-developing receptacle, of a print-engaging device pivoted to rotate about an axis located above said receptacle and operative to conduct an exposed print in an arcuate path therethrough, and guiding means cooperable with the print for insuring its passage below the level of the liquid in said receptacle.

10. In photographic apparatus of the class described, the combination with a developer receptacle, of a support, a print-engaging device mounted rotatably on a horizontal axis on said support, the latter being movable to position said axis above the developer receptacle, and the print-engaging device being operative about said axis to conduct an exposed print in an arcuate path downwardly into and upwardly out of said receptacle.

11. In photographic apparatus of the class described, the combination with a developer receptacle, of an arm movable to and from a position at a side of said receptacle, and a print-engaging device rotatably mounted on said arm on an axis which extends above said receptacle when said arm is in said position, said device being operative, when rotated about said axis, to conduct an exposed print into and out of said receptacle.

12. In photographic apparatus of the class described, the combination with a developer receptacle, of a member mounted to swing toward said receptacle, a print-engaging device swingably mounted on said member, means for swinging said device relatively to said member to cause an exposed print to be conducted through said receptacle and to support the print in elevated position after the removal from the receptacle, and means for swinging said member to carry the print away from the developer receptacle.

13. In photographic apparatus of the class described, the combination with a developer receptacle having a print-submerging guide therein, of a support for a shaft arranged above said receptacle, and a print-engaging device mounted to swing about the center of said shaft as an axis and operative to conduct an exposed print into said receptacle beneath the print-submerging guide therein.

14. In photographic apparatus of the class described, the combination with adjacently-located developer and fixing receptacles, a member mounted to swing toward and from the developer receptacle, a print-engaging device rotatably mounted on said member, means for rotating said device, while said member occupies a position toward the developer receptacle, to cause it to carry an exposed print through the developer receptacle and to remove it therefrom, and means for swinging said member from the developer receptacle toward the fixing receptacle while the print-engaging device supports the print removed from the developer receptacle.

15. In photographic apparatus of the class described, the combination with relatively fixed developer and fixing receptacles, of a member reciprocable alternately toward the respective receptacles, a print-engaging device rotatably mounted on said member and carrying print-engaging grippers, means for rotating said device in one direction to bring the grippers into position to receive an exposed print and then in a reverse direction to carry such print through the developer receptacle and to remove it therefrom, means for automatically causing opening and closing of the grippers as the latter move into print-receiving position, means for swinging said member and the print-engaging device while the latter supports the print, toward the fixing receptacles to deposit the developed print therein, and means operative to open the grippers and thus release the print during the latter movement of said member and print-engaging device.

16. In photographic apparatus of the class described, the combination with relatively fixed developer and fixing receptacles, of print-engaging means mounted to swing on one radius to carry an exposed print into and out of the developer receptacle and on another radius to transfer the developed print to the fixing receptacle.

17. In photographic apparatus of the class described, the combination with developer and fixing receptacles, of a print-engaging device operative to conduct an exposed print into and out of the developer receptacle, a member operative to shift said device to transfer the developed print to the fixing receptacle, and means including a cam shaft for actuating said device and member.

18. In photographic apparatus, the combination of means for exposing a section of a strip of photographic paper, means for advancing such section, means for severing the exposed section from the remainder of the strip, a print-engaging device movable into a position to receive the exposed section of paper and operative to conduct such section into and out of the developer receptacle, means for shifting the print-engaging device to transfer the developed print to the fixing receptacle, and actuating means common to the print-engaging device and the shifting means for actuating them.

In testimony whereof I have hereunto set my hand.

ARTHUR W. CAPS